(12) United States Patent
Khizar et al.

(10) Patent No.: US 11,071,176 B2
(45) Date of Patent: Jul. 20, 2021

(54) DIVIDER ASSEMBLY FOR A MICROWAVE OVEN

(71) Applicant: WHIRLPOOL CORPORATION, Benton Harbor, MI (US)

(72) Inventors: Muhammad Khizar, St. Joseph, MI (US); Vincent D. Csapos, Hamilton, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 278 days.

(21) Appl. No.: 16/308,895

(22) PCT Filed: Aug. 11, 2016

(86) PCT No.: PCT/US2016/046554
§ 371 (c)(1),
(2) Date: Dec. 11, 2018

(87) PCT Pub. No.: WO2018/031019
PCT Pub. Date: Feb. 15, 2018

(65) Prior Publication Data
US 2019/0159300 A1    May 23, 2019

(51) Int. Cl.
*H05B 6/64* (2006.01)
*H05B 6/68* (2006.01)
*H05B 6/76* (2006.01)
*B82Y 30/00* (2011.01)
*F24C 15/16* (2006.01)

(52) U.S. Cl.
CPC ............ *H05B 6/6402* (2013.01); *B82Y 30/00* (2013.01); *H05B 6/64* (2013.01); *H05B 6/766* (2013.01); *F24C 15/16* (2013.01)

(58) Field of Classification Search
CPC ......... F24C 15/16; H05B 6/64; H05B 6/6402; H05B 6/76; H05B 6/766
USPC ....... 219/744, 702, 756, 746, 696, 697, 748, 219/761, 716, 750, 709
See application file for complete search history.

(56) References Cited

U.S. PATENT DOCUMENTS 4,140,888 A  2/1979  Baron et al.
5,981,927 A  11/1999  Osepchuk et al.
(Continued)

FOREIGN PATENT DOCUMENTS

BE    867122 A1    9/1978
DE    3923734 C1   8/1990
(Continued)

OTHER PUBLICATIONS

US 8,420,991 B2, 04/2013, Mihara et al. (withdrawn)

*Primary Examiner* — Quang T Van
(74) *Attorney, Agent, or Firm* — Price Heneveld LLP

(57) ABSTRACT

A divider assembly is provided for dividing a cooking cavity of a microwave oven into two cooking subcavities. The divider assembly includes a first tempered glass panel, a metal frame extending around the periphery of the first tempered glass panel to support the first tempered glass panel, a honeycomb core positioned above the first tempered glass panel, a second tempered glass panel positioned above the honeycomb core, and a gasket extending around the periphery of the metal frame for engaging metal walls of the microwave oven, wherein the gasket includes small-diameter, long-length carbon nano-tubes.

20 Claims, 2 Drawing Sheets

(56) References Cited

U.S. PATENT DOCUMENTS

| | | | |
|---|---|---|---|
| 7,071,448 | B1 | 7/2006 | Kim et al. |
| 7,087,872 | B1 | 8/2006 | Dobie et al. |
| 7,129,447 | B1 | 10/2006 | Kim et al. |
| 7,183,520 | B2 | 2/2007 | Park |
| 2002/0060215 | A1 | 5/2002 | Allera et al. |
| 2008/0087662 | A1 | 4/2008 | Takizaki et al. |
| 2010/0176123 | A1* | 7/2010 | Mihara ................ H05B 6/686 219/746 |
| 2011/0073344 | A1 | 3/2011 | Zhang et al. |
| 2011/0266463 | A1 | 11/2011 | Einziger et al. |
| 2013/0153570 | A1* | 6/2013 | Carlsson ................ H05B 6/80 219/702 |
| 2017/0251529 | A2* | 8/2017 | Spagnoli ................ H05B 6/68 |

FOREIGN PATENT DOCUMENTS

| | | |
|---|---|---|
| EP | 1672284 A1 | 6/2006 |
| EP | 2789920 A1 | 10/2014 |
| EP | 2630839 B1 | 11/2014 |
| GB | 2002210 | 7/1978 |
| JP | S5842195 A | 3/1983 |
| RU | 2127649 C1 | 3/1999 |
| WO | 2009011111 A1 | 1/2009 |
| WO | 0182653 A1 | 11/2011 |
| WO | 2015099648 A1 | 7/2015 |

\* cited by examiner

DIVIDER ASSEMBLY FOR A MICROWAVE OVEN

BACKGROUND

The present device generally relates to a divider assembly for a microwave oven, and more specifically, to a divider assembly for dividing a cooking cavity of a microwave oven into two cooking subcavities.

SUMMARY

In at least one aspect, a divider assembly is provided for dividing a cooking cavity of a microwave oven into two cooking subcavities. The divider assembly comprises: a first tempered glass panel; a metal frame extending around the periphery of the first tempered glass panel to support the first tempered glass panel; a honeycomb core positioned above the first tempered glass panel; a second tempered glass panel positioned above the honeycomb core; and a gasket extending around the periphery of the metal frame for engaging metal walls of the microwave oven, wherein the gasket comprises small-diameter, long-length carbon nano-tubes.

In at least another aspect, a microwave oven is provided that comprises: an enclosed cavity; a divider assembly disposed within the enclosed cavity so as to divide the enclosed cavity into a first subcavity and a second subcavity; at least one first microwave source for generating microwave energy within the first subcavity to cook food disposed therein; and at least one second microwave source for generating microwave energy within the second subcavity to cook food disposed therein. The divider assembly comprises: a first tempered glass panel; a metal frame extending around the periphery of the first tempered glass panel to support the first tempered glass panel; a honeycomb core positioned above the first tempered glass panel; a second tempered glass panel positioned above the honeycomb core; and a gasket extending around the periphery of the metal frame for engaging metal walls of the microwave oven, wherein the gasket comprises small-diameter, long-length carbon nano-tubes.

These and other features, advantages, and objects of the present device will be further understood and appreciated by those skilled in the art upon studying the following specification, claims, and appended drawings.

DETAILED DESCRIPTION OF EMBODIMENTS

Figure 1:
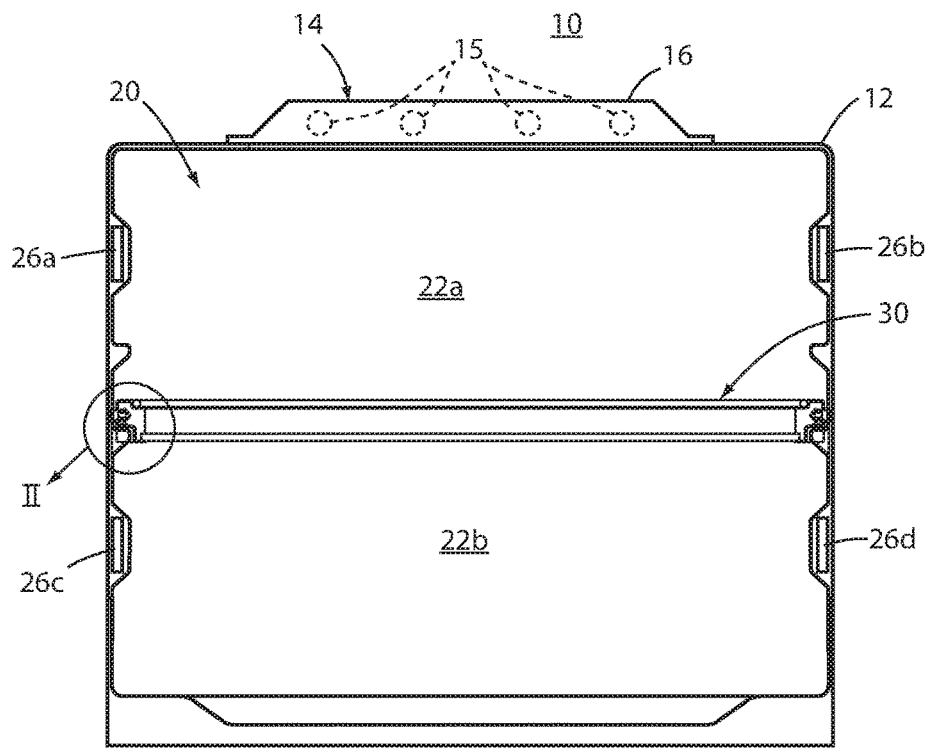
FIG. 1 is an elevational view of the inside of a microwave oven constructed according to the embodiments described herein.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As noted above, the embodiments described herein pertain to a cooking apparatus, and more particularly to an electromagnetic cooking device, such as a microwave oven. Microwave ovens having four solid-state microwave sources are known in which the cooking cavity may be divided into two subcavities where there are two of the sources provided for each subcavity. This allows for multi-functional, multi-sectional operation of a single cavity microwave oven. This saves money as well as consumer kitchen space for multiple ovens. An example of such a microwave oven is disclosed in commonly-assigned International PCT Application No. US2016/035727, filed on Jun. 3, 2016, entitled METHOD AND DEVICE FOR ELECTROMAGNETIC COOKING, the entire disclosure of which is incorporated herein by reference.

Referring to the embodiment illustrated in FIG. 1, reference numeral 10 generally designates a cooking apparatus, and more specifically a microwave oven. The microwave oven 10 includes a cabinet 12 having an enclosed cooking cavity 20, a divider assembly 30 disposed within the enclosed cavity 20 so as to divide the enclosed cavity into a first subcavity 22a and a second subcavity 22b, at least one first microwave source 26a, 26b for generating microwave energy within the first subcavity 22a to cook food disposed therein, and at least one second microwave source 26c, 26d for generating microwave energy within the second subcavity 22b to cook food disposed therein. As discussed further below with reference to FIGS. 2-4, the divider assembly 30 includes a first tempered glass panel 40, a metal frame 32 extending around the periphery of the first tempered glass panel 40 to support the first tempered glass panel 40, a honeycomb core 38 positioned above the first tempered glass panel 40, a second tempered glass panel 34 positioned above the honeycomb core 38, a tin-oxide coating 36 on a surface of one of the first and second tempered glass panels 40, 34, and a gasket 44 extending around the periphery of the metal frame 32 for engaging metal walls 54 of the microwave oven 10, wherein the gasket 44 comprises small-diameter, long-length carbon nano-tubes. In the examples shown in FIGS. 2 and 4, the tin-oxide coating 36 is provided on the bottom surface of the second tempered glass panel 34. The divider assembly 30 may further include at least one foot 60 extending downward from a surface 58 of the metal frame 32 for engaging at least one shelf ledge 56 that extends from inner walls 50 of the microwave oven 10. Each foot 60 may extend through an aperture in the metal frame 32. The feet 60 may be made of PTFE or the like.

Honeycomb core 38 is provided to attenuate radio frequency (RF) radiation from first microwave sources 26a and 26b from radiating into the second subcavity 22b and to attenuate RF radiation from second microwave sources 26c and 26d from radiating into the first subcavity 22a. Thermal insulation may also be provided between glass panes 34 and 40 if desired to provide additional thermal isolation of first and second subcavities 22a and 22b. The metal frame 32 also severs to block RF radiation at the edges of the honeycomb core 38. Honeycomb core 38 may be made of aluminum or stainless steel and may have a cell size of about ⅛ of an inch (0.3175 cm).

By providing an electrically conductive gasket 44 through the use of the small-diameter, long-length carbon nano-tubes, the divider assembly 30 may better contain the RF radiation in each subcavity 22a and 22b by preventing the RF radiation from passing around the edges of the metal frame 32 and the divider assembly 30. The gasket 44 electrically couples the metal frame 32 and the metal side walls 54 of the microwave oven 10 to provide a path for surface currents on the divider assembly 30 to pass to ground. Gasket 44 also provides a good thermal seal to avoid thermal leakage between the subcavities.

The divider assembly 30 also is configured to serve as a load bearing cooking structure for the first subcavity 22a. With the structure described herein, the divider assembly 30 may provide such structural support without compromising the RF shielding effectiveness of the gasket 44.

Referring back to FIG. 1, the microwave oven 10 may include an optional supplemental heating system 14 positioned to heat the food placed in the enclosed cavity 20. The supplemental heating system 14 includes at least one IR radiation source 15 for generating infrared (IR) radiation that is projected into the enclosed cavity 20 and a cover 16. By providing the tin-oxide coating 36 on the bottom surface of the second tempered glass panel 34, the IR radiation from the supplemental heating system 14 may be blocked from reading the second subcavity 22b below the divider assembly 30. This allows the food in the first subcavity to be browned using the IR radiation without exposing the food in the second subcavity to such browning.

Figure 2:
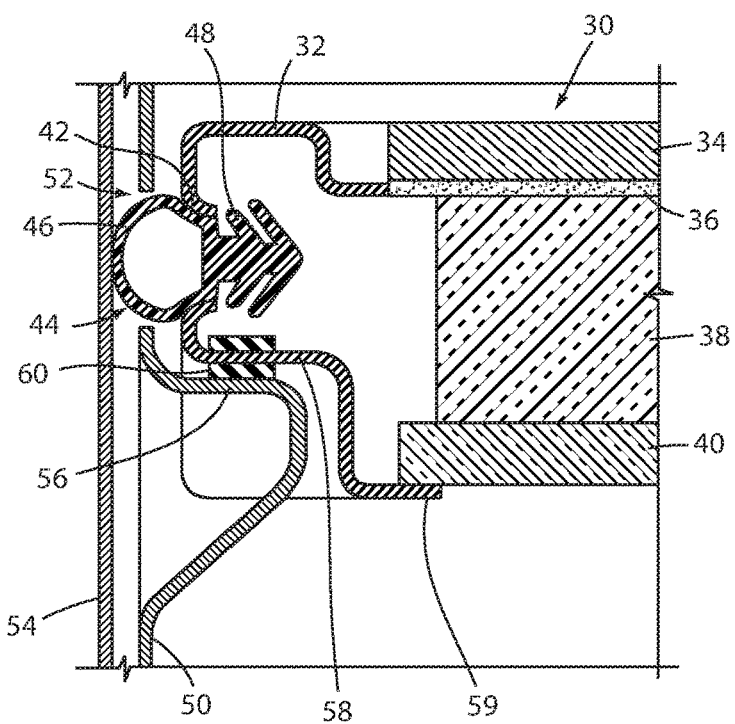
FIG. 2 is an enlarged cross-sectional view of the area II of a divider assembly of the microwave oven shown in FIG. 1.
Figure 3:
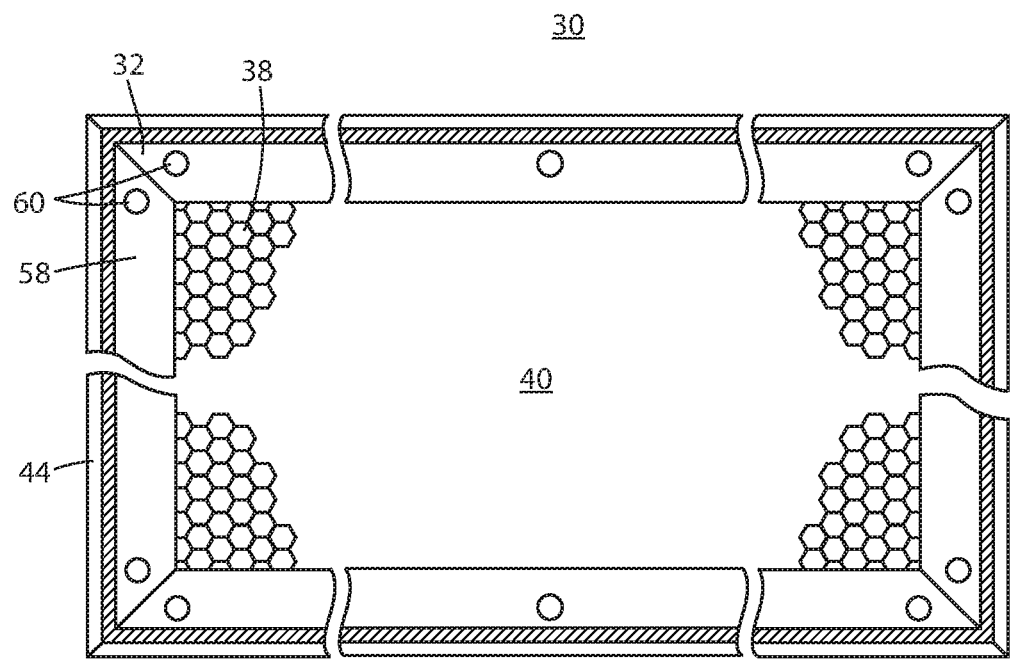
FIG. 3 is a bottom plan view of a divider assembly.

With reference to FIG. 2, the walls of the microwave oven 10 may include multiple walls arranged in layers. For example, a metal wall 54 may be provided with an inner wall 50 disposed inside of metal wall 54. Inner wall 50 may be composed of plastic or the like. As shown, inner wall 50 may have several shelf ledges 56 formed therein to provide a surface on which the divider assembly 30 may rest. Inner wall 50 may also have a slot 52 through which a bulbous portion 46 of gasket 44 may extend to make physical and electrical contact with the metal wall 54. Gasket 44 may have a ribbed flange 48 that extends through a slot 42 in the peripheral edge of metal frame 32 with the ribs securing the gasket 44 at the edge of metal frame 32. Metal frame 32 may have a lip 59 that extends under first glass pane 40 to hold it in place. Note that an upper edge of metal frame 32 may contact either tin oxide coating 36 or honeycomb core 38 to provide an electrical path to ground via the gasket 44 and the metal side wall 54.

The gasket 44 may be constructed using a high temperature silicon tube that is surrounded by small-diameter, long-length carbon nano-tubes. These carbon nano-tubes may be made using a chemical vapor deposition method. Briefly, as defined herein small-diameter, long-length carbon nano-tubes are seamless cylinder-shaped macromolecules with a diameter as small as a few nanometers, and up to several hundred micrometers in length. The walls of these tubes are constructed of a hexagonal lattice of carbon atoms and are capped by fullerene-like structures. The unique structure of small-diameter, long-length carbon nano-tubes can be divided mainly into multi-walled carbon nano-tubes (MWCNTs) and single-walled carbon nano-tubes (SWCNTs). MWCNTs are composed of two or more concentric cylindrical shells of graphene sheets coaxially arranged around a central hollow area with spacing between the layers. In contrast, SWCNTs are made of a single cylinder graphite sheet held together by van der Waals bonds. For the present application, SWCNTs or MWCNTs can be used. Preferably, small diameter, long length carbon nano-tubes in a ring shape are used for this application. Carbon nano-tubes have mutable hybridization states and have sensitivity of the structure to perturbations in synthesis conditions that exploit their unique physical, chemical and electronic properties. These carbon nano-tubes are many times better in their physical, mechanical, electrical and thermal properties than aluminum and copper, which is being used in most of the current production products. Below is a table showing some of their key properties.

| Properties | SWCCNTs | MWCNTs |
|---|---|---|
| Specific Gravity | 0.8 g/cm$^3$ | 1.8 g/cm$^3$ |
| Elastic Modulus | ~1 TPa | ~0.3-1 TPa |
| Strength | 50-500 GPa | 10-60 GPa |
| Resistivity | 5-50 μΩcm | 5-50 μΩcm |
| Thermal Conductivity | 3000 Wm$^{-1}$K$^{-1}$ | 3000 Wm$^{-1}$K$^{-1}$ |
| Thermal Stability | >700° C. (in air) 2800° C. (in vacuum) | >700° C. (in air) 2800° C. (in vacuum) |
| Specific Surface Area | ~400-900 m$^2$/g | ~200-400 m$^2$/g |

Figure 4:
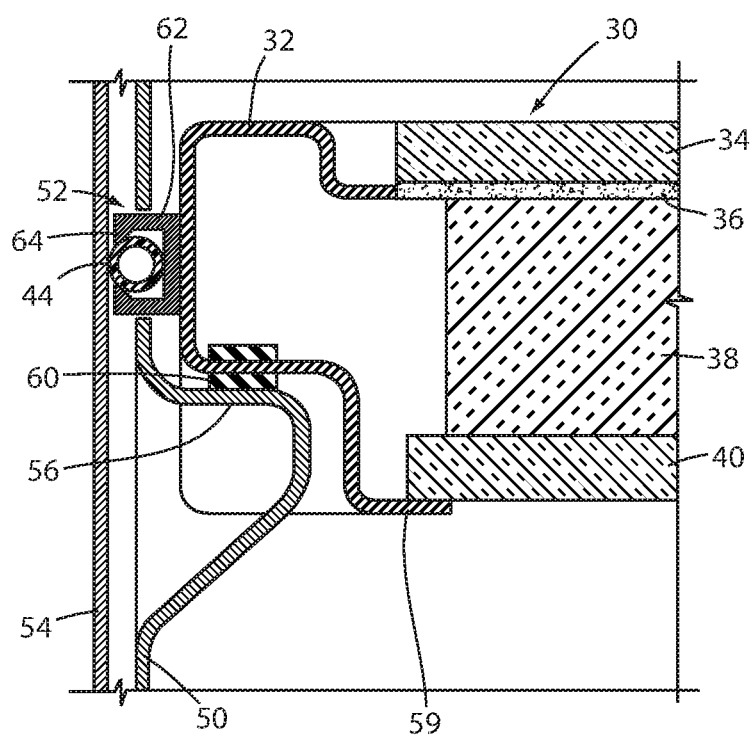
FIG. 4 is an enlarged cross-sectional view of a divider assembly that may be used in the microwave oven of FIG. 1.

FIG. 4 illustrates an alternative structure for the gasket 44 and the metal frame 32. Specifically, the gasket 44 is formed of a cylindrical tube having a circular cross section that is secured to the frame using an electrically conductive securing member 62 having a dove-tail groove 64 in which the gasket 44 is secured. It is also possible to integrate securing member 62 into metal frame 32. Such an arrangement allows a more simple design of the gasket 44 than in the structure shown in FIG. 2.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A divider assembly for dividing a cooking cavity of a microwave oven into two cooking subcavities, the divider assembly comprising:
   a first tempered glass panel;
   a metal frame extending around the periphery of the first tempered glass panel to support the first tempered glass panel;
   a honeycomb core positioned above the first tempered glass panel;
   a second tempered glass panel positioned above the honeycomb core; and
   a gasket extending around the periphery of the metal frame for engaging metal walls of the microwave oven, wherein the gasket comprises small-diameter, long-length carbon nano-tubes.

2. The divider assembly of claim 1, wherein the gasket is electrically conductive so as to electrically couple the metal frame to the metal walls of the microwave oven.

3. The divider assembly of claim 1, wherein the gasket comprises a high temperature silicon tube around which the small-diameter, long-length carbon nano-tubes are formed.

4. The divider assembly of claim 1, wherein the small-diameter, long-length carbon nano-tubes are single-walled carbon nano-tubes.

5. The divider assembly of claim 1, wherein the small-diameter, long-length carbon nano-tubes are multi-walled carbon nano-tubes.

6. The divider assembly of claim 1, wherein the small-diameter, long-length carbon nano-tubes are formed from a hexagonal lattice of carbon atoms.

7. The divider assembly of claim 6, wherein the hexagonal lattice of carbon atoms is capped by fullerene-like structures.

8. The divider assembly of claim 1, and further comprising at least one foot extending downward from a surface of the metal frame for engaging at least one shelf ledge that extends from the inner walls of the microwave oven.

9. The divider assembly of claim 1, and further comprising a tin-oxide coating on a surface of one of the first and second tempered glass panels.

10. The divider assembly of claim 9, wherein the tin-oxide coating is disposed on a surface of the second tempered glass panel.

11. An electromagnetic cooking device comprising:
    an enclosed cavity;
    the divider assembly of claim 1 disposed within the enclosed cavity so as to divide the enclosed cavity into a first subcavity and a second subcavity;
    at least one first microwave source for generating microwave energy within the first subcavity to cook food disposed therein; and
    at least one second microwave source for generating microwave energy within the second subcavity to cook food disposed therein.

12. A microwave oven comprising:
    an enclosed cavity;
    a divider assembly disposed within the enclosed cavity so as to divide the enclosed cavity into a first subcavity and a second subcavity;
    at least one first microwave source for generating microwave energy within the first subcavity to cook food disposed therein; and
    at least one second microwave source for generating microwave energy within the second subcavity to cook food disposed therein,
    wherein the divider assembly comprises:
      a first tempered glass panel;
      a metal frame extending around the periphery of the first tempered glass panel to support the first tempered glass panel;
      a honeycomb core positioned above the first tempered glass panel;
      a second tempered glass panel positioned above the honeycomb core; and
      a gasket extending around the periphery of the metal frame for engaging metal walls of the microwave oven, wherein the gasket comprises small-diameter, long-length carbon nano-tubes.

13. The microwave oven of claim 12, wherein the gasket is electrically conductive so as to electrically couple the metal frame to the metal walls of the microwave oven.

14. The microwave oven of claim 12, wherein the gasket comprises a high temperature silicon tube around which the small-diameter, long-length carbon nano-tubes are formed.

15. The microwave oven of claim 12, wherein the small-diameter, long-length carbon nano-tubes are single-walled carbon nano-tubes.

16. The microwave oven of claim 12, wherein the small-diameter, long-length carbon nano-tubes are multi-walled carbon nano-tubes.

17. The microwave oven of claim 12, and further comprising at least one foot extending downward from a surface of the metal frame for engaging at least one shelf ledge that extends from the inner walls of the microwave oven.

18. The microwave oven of claim 12, and further comprising a tin-oxide coating on a surface of one of the first and second tempered glass panels.

19. The microwave oven of any one of claim 18, wherein the tin-oxide coating is disposed on a surface of the second tempered glass panel.

20. The microwave oven of claim 12, wherein the at least one first microwave source includes two solid-state microwave sources and the at least one second microwave source includes two solid-state microwave sources.

* * * * *